United States Patent [19]

Munchbach

[11] 3,759,117
[45] Sept. 18, 1973

[54] GEAR FOR DRIVING FLYING SHEARS

[75] Inventor: Curt Munchbach, Pforzheim-Sonnenberg, Germany

[73] Assignee: Irma Ungerer, Pforzheim, Germany

[22] Filed: Jan. 29, 1971

[21] Appl. No.: 110,820

[30] Foreign Application Priority Data
Jan. 29, 1970 Germany.................. P 20 03 922.9

[52] U.S. Cl........................ 74/681, 67/675, 83/298
[51] Int. Cl............................ F16h 37/06, B26d 1/56
[58] Field of Search ................ 74/681, 675; 83/298

[56] References Cited
UNITED STATES PATENTS
2,833,160  5/1958  Morgan................................ 74/681
3,128,662  4/1964  Obenskain...................... 74/681 X
3,212,358  10/1965  DeLelio .............................. 74/687
3,442,153  5/1969  Ross..................................... 74/687
3,446,093  5/1969  Orshansky, Jr. ...................... 74/687

FOREIGN PATENTS OR APPLICATIONS
851,083  10/1960  Great Britain....................... 74/681

*Primary Examiner*—Arthur T. McKeon
*Attorney*—Edwin E. Greigg

[57]  ABSTRACT

In a change speed gear associated with flying shears for varying the travelling speed thereof and thus changing at will the sectional length of a material fed through the shears at a constant speed and severed by said shears, there are provided two steplessly shiftable drive assemblies continuously connected to a drive motor and selectably connectable to an output shaft continuously connected to the flying shears.

9 Claims, 1 Drawing Figure

PATENTED SEP 18 1973　　　3,759,117
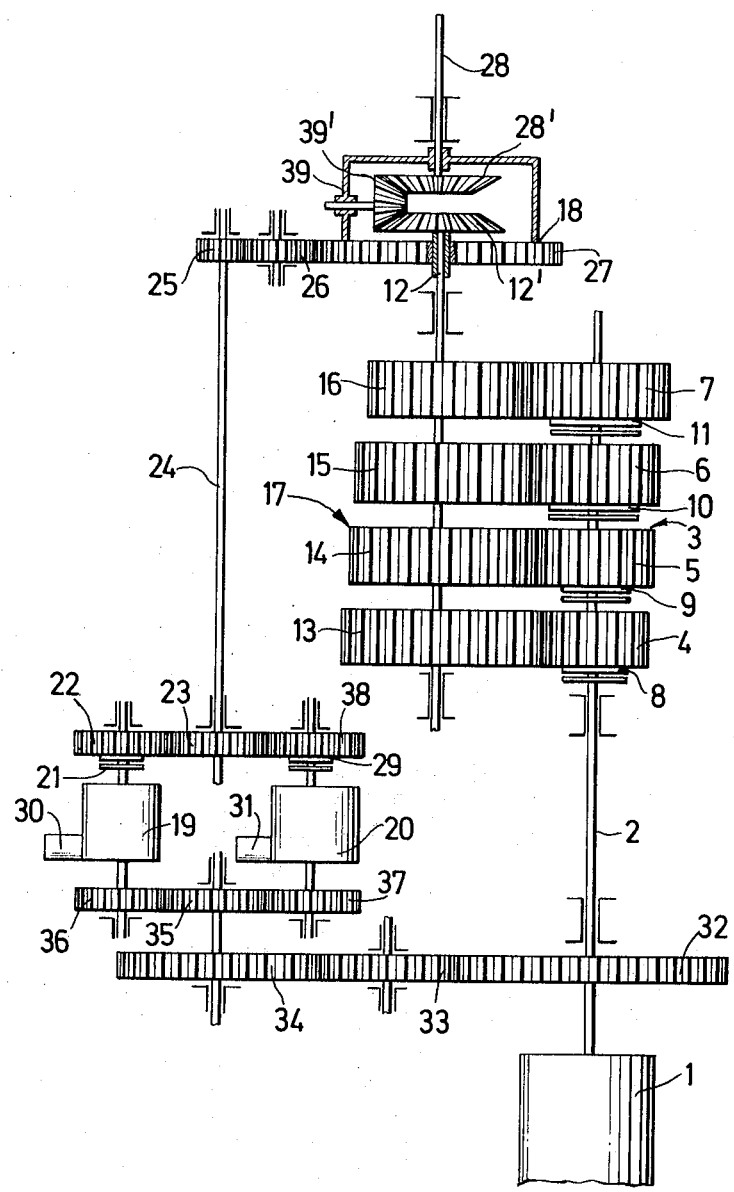

GEAR FOR DRIVING FLYING SHEARS

BACKGROUND OF THE INVENTION

This invention relates to a change speed gear for driving flying shears which periodically sever continuously advanced sheet-like materials.

Flying shears are known and are widely used for severing continuously advanced goods passing through the shear blades. The latter move continuously in a closed curved path substantially parallel to themselves and proceed synchronously with the web with the aid of known synchronizing devices during the cutting operation proper, for example, during the cutting of a metal web into sheet sections of determined length.

More recently, flying shears have been used not only to cut coiled metal sheets of finite lengths into desired dimensions, but have found application in increasing numbers in so-called refining devices, such as zincing and tinning apparatuses. For treatment in the latter, the sheets are stapled together to form an endless web. Because of the uniformity of the tin or zinc layer to be applied, it is required that the endless web pass through these apparatuses with constant speed.

In order to vary the distance between cuts and thus vary the length of the goods travelling with constant speed through the cutting mechanism, it is known to change the driving rpm of the shears and thus change their speed of travel parallel with the web. If the driving rpm of the shears is decreased, the length of the severed goods will increase since the severing operation occurs in a slower succession. If, on the contrary, the driving rpm of the shears is increased, then a cutting operation of more rapid sequence is obtained, resulting in shorter sectional length of the material. It is also known to provide means for causing "misses" in the cutting sequence to multiply the distance between cuts.

In order to effect a change in the rpm of the driving means for the shears, it is known to provide change speed gears therefor. Earlier known driving means have permitted a switching to another rpm and thus to another sectional length only in a stationary condition of the cutting device. The substantial delay connected with the shifting to another rpm made it necessary to provide expensive storage mechanisms for the take-up of the web portion which accumulated due to its constant speed during said delays and then to deplete the accumulated band at an increased advancing speed.

German Published Patent Application DAS 1,171,240 discloses a change speed gear permitting a short shifting time. It is built as a dual gear assembly and comprises two gear sets disposed in a gear box. At any time only one of the gear sets participates in the driving of the flying shears. In the momentarily inoperative, disconnected gear set change speed pinions may be manually inserted and thus a new rpm may be preselected. Thereafter, this known change speed gear assembly may be shifted to the preselected new rpm relatively rapidly, during run, by a change-over to the other gear set. By changing the driving gear sets, the driving rpm of the flying shears may be changed stepwise, effecting an adjustment of the sectional length of the web in steps of several millimeters.

OBJECT, SUMMARY AND ADVANTAGES OF THE INVENTION

It is an object of the invention to provide an improved change speed gear of the aforenoted type which, during full speed of the web, may be shifted very rapidly and which permits a stepless change of the driving rpm for the stepless setting of the length of the severed material.

Known stepless gear assemblies are not adapted to achieve the above object, because for flying shears only non-slip, positive engaging stepless gears may be used which are shiftable only while running and with a shifting time of approximately 60 seconds. Because of the long shifting time, the use of the afore-outlined storage mechanisms had to be resorted to.

Briefly stated, according to the invention, in the change speed gear assembly there are provided two steplessly shiftable positive engaging gear sets arranged parallel to one another which are in continuous connection with a drive motor and which, by means of clutches, are connectable in an alternate manner to a common output shaft.

In this manner it is possible to utilize the known steplessly shiftable positive engaging drive means, since at any time only one of them is in operation for driving the flying shears. Thus, for the setting of the other stepless gear set which runs idle with the operative one, there is ample time available, while a shift to the new rpm may thereafter occur very rapidly (within less than 5 seconds).

The invention will be better understood as well as further objects and advantages of the invention will become more apparent from the ensuing detailed specification of a preferred embodiment taken in conjunction with the sole FIGURE which is a schematic illustration of the change speed gear according to the invention.

DESCRIPTION OF THE PREFERRED EMBODIMENT

A main electric motor 1 serving as the driving motor rotates an input shaft 2 on which there is mounted a stepping gear set generally indicated at 3 formed of spur gears 4, 5, 6 and 7 which are freely rotatably held on the input shaft 2 and which may be individually coupled thereto by means of respective electromagnetic clutches 8, 9, 10 and 11. The gear wheels of the first gear set 3 mesh with respective stepdown spur gears 13, 14, 15 and 16, forming a second stepping gear set generally indicated at 17. Each gear wheel 13 – 16 is fixedly keyed to a shaft 12 which constitutes the output shaft of the transmission gear assembly formed of gear sets 3 and 17. The output shaft 12 extends into a differential 18 and is connected with a sun gear 12' disposed in cage 39 formed as a housing. The sun gear 12' meshes with a planet gear 39' which is supported in the cage 39 and which transmits the rpm of the sun gear 12' with reverse direction of rotation to a sun gear 28' which, in turn, is keyed to the drive shaft 28 of the flying shears (not shown).

The main electric motor 1 further rotates two steplessly shiftable drive assemblies 19 and 20. A spur gear 32 keyed to the output shaft of the main electric motor 1 drives a spur gear 34 through a spur gear 33 supported on an intermediate shaft. The gear wheel 34, in turn, simultaneously drives, through a stepdown spur gear 35, the two driving spur gears 36 and 37 of the respective stepless drive assemblies 19 and 20. To the output shafts of the drive assemblies 19 and 20 which are steplessly shiftable by means of respective shifting motors 30 and 31, there are coupled respective spur gears 22 and 38 by means of electromagnetic clutches 21 and 29, respectively. The spur gears 22 and 38 both mesh with a spur gear 23 which is keyed to a common output shaft 24 connected with the differential 18 through meshing spur gears 25 and 26. The latter, in turn, meshes with a gear wheel 27 which is fixedly secured to the cage 39 of the differential 18. The transmission gear assembly 3, 17 and the stepless drive assemblies 19 and 20 are so designed that a steplessly settable rpm range of 1:1 to 1:2 may be achieved. If the clutch 9 of the spur gear 5 is closed, then, through the input shaft 2 and the gear pair 5 and 14, the drive motor 1 rotates the output shaft 12 with an rpm which is changed with respect to the motor rpm to the extent of the gear ratio of the two spur gears 5 and 14. The sun gear 12' of the differential 18 connected to the drive shaft 12 rotates the sun gear 28' and thus the drive shaft 28 of the flying shears through the planet gear 39' in a direction reverse with respect to the rotation of shaft 12. The rpm of the sun gear 28' and the drive shaft 28 are additionally determined by the adjustment of the connected steplessly shiftable drive assembly 19. The latter, driven by the main electric motor 1 through spur gears 33, 34, 35 and 36, drives, through the closed electromagnetic clutch 21, the spur gears 22, 23, the common output shaft 24, the spur gears 25, 26 and the gear wheel 27. The latter, in turn, rotates the cage 39 of the differential 18. The planet gear 39' orbits on the sun gears 12' and 28' and transmits the double of the rpm of the cage 39 to the sun gear 28' and thus to the drive shaft 28. The direction of rotation of the cage 39 is in the present case so chosen that the rpms are added. The rpm-sum of the drive shaft 28 thus obtained then exactly corresponds to the desired sectional length of the web to be periodically severed.

The other stepless drive assembly 20, the electromagnetic clutch 29 of which is open, runs idle and is ready to be changed to the preselected new rpm.

For setting a driving rpm of the flying shears for the purpose of obtaining a new sectional length of the cut web, another stepping gear pair to be activated is selected with the aid of a table. The latter also helps to determine the necessary additional rpm which has to be applied to the differential 18 by the stepless drive assembly 20. The setting of the additional rpm is performed according to a scale on the idling stepless drive assembly 20 by means of the shifting motor 31. The shifting to the new rpm occurs at the desired moment by closing the clutches of the selected stepping gear pair and by simultaneously opening the clutches associated with the stepping gear pair operating to that moment. At the same time, the electromagnetic clutch 29 of the stepless drive assembly 20 is closed and the electromagnetic clutch 21 of the stepless drive assembly 19 is opened. The shifting time required for this operation is under 5 seconds. Thereafter, the stepless drive assembly 19 runs idle and is thus ready for a preselected rpm adjustment. The opening and closing of the electromagnetic clutches may be effected by means of push button circuits (not shown).

Since the shifting time of an individual stepless drive assembly 19 or 20 has no effect on the shifting time of the change speed gear assembly, any type of non-slip, positive engaging stepless drive assembly may be used. For example, the drive assembly known under the tradename "PIV" may be used; it may be set only while running and its setting time is approximately 60 seconds.

The clutches used in the aforedescribed change speed gear assembly may be a force-locking friction clutch of any type provided with one or more friction discs or combined with positive engaging elements such as ring gears. Besides electromagnetic clutches, hydraulically or pneumatically operated friction clutches may be used. The only requirement is that shifting should be possible without an rpm drop.

The advantage of combining the stepless drive assemblies 19, 20 with the transmission gear assembly 3, 17 resides in the fact that the entire stepdown does not have to be supplied by the stepless drive assemblies alone; yet, it is possible to set the output rpm (i.e. the rpm for the flying shears) in a stepless manner by means of the stepless drive assemblies. In addition, the use of differential 18 has the substantial advantage that the entire driving torque for the flying shears does not have to pass through the momentarily operative stepless drive assembly 19 or 20. The rpm steps of the transmission gear assembly 3, 17 are bridged over in the differential 18 by adding to the downstepped rpms of the transmission gear assembly the steplessly adjusted rpms from the connected stepless drive assembly 19 or 20. In this manner a gapless and stepless rpm setting range is obtained.

What is claimed is:

1. A change speed gear arrangement for the rapid switching from one output rpm to another, preselected steplessly settable rpm, comprising,
  A. a drive motor,
  B. two parallel-connected, positive engaging steplessly settable drive assemblies, whereby the drive assemblies can be corrected in a positive or negative manner to agree with the preselected rpm, each drive assembly having an input side and an output side,
  C. means continuously connecting both said input sides of said drive assemblies to said motor,
  D. a common output shaft, and
  E. clutch means for alternately connecting said output sides of said drive assemblies to said common output shaft to thereby drive said output shaft at the preselected rpm associated with the connected drive assembly.

2. A change speed gear arrangement as defined in claim 1, including
  A. a transmission gear assembly shiftable in steps,
  B. an input shaft connecting said drive motor to said transmission gear assembly and
  C. an additional output shaft operatively connected to said transmission gear assembly.

3. A change speed gear arrangement as defined in claim 2, including
  A. a driven shaft the and
  B. means connecting said output shafts to said driven shaft.

4. A change speed gear arrangement as defined in claim 3, wherein said means connecting said output shafts to said driven shaft includes a differential.

5. A change speed gear arrangement as defined in claim 4, wherein said differential includes
  A. a cage rotatably connected with said common output shaft,
  B. a first sun gear keyed to said additional output shaft,
  C. a second sun gear keyed to said driven shaft and D. a planet gear held in said cage and meshing with said sun gears; said planet gear orbiting about said sun gears upon rotation of said cage.

6. A change speed gear arrangement as defined in claim 1, wherein each drive assembly is connected to a separate shifting motor.

7. A change speed gear arrangement as defined in claim 1, wherein each drive assembly is connectable to said common output shaft by a separate friction clutch.

8. A change speed gear arrangement as defined in claim 2, including
A. a plurality of spur gears freely rotatably mounted on said input shaft and forming part of said transmission gear assembly,
B. clutch means associated with said spur gears for selectively coupling the latter to said input shaft and
C. a plurality of stepdown gears keyed to said additional output shaft and forming part of said transmission gear assembly; each of said stepdown gears meshes with one on said spur gears.

9. A change speed gear arrangement as defined in claim 8, wherein said clutch means is formed of a plurality of friction clutches, one associated with each said spur gear on said input shaft.

* * * * *